Feb. 26, 1963     C. K. LEEPER     3,078,877
LABYRINTH CONTROL VALVE
Filed July 19, 1960

INVENTOR
Charles K. Leeper
BY
ATTORNEYS

United States Patent Office 3,078,877
Patented Feb. 26, 1963

3,078,877
LABYRINTH CONTROL VALVE
Charles K. Leeper, Annandale, Va., assignor, by mesne assignments, to United Nuclear Corporation, New York, N.Y., a corporation of Delaware
Filed July 19, 1960, Ser. No. 43,798
3 Claims. (Cl. 138—43)

This invention relates to valves and particularly to valves for controlling flow rates of heavy viscous fluids, suspensions, pastes, fluidized industrial materials containing relatively massive particles, semi-solid foods and the like.

More and more materials are being adapted for flowing transport. A list of such materials would encompass many things not ordinarily considered to be fluids. Methods have been devised for suspending particulate materials in various media so that they may be pumped. For various applications, mixtures containing large solids such as concrete or mud are pumped. Also, in food processing factories fruits and vegetables are transported in flowing streams. They may be chopped or as often with cherries and berries they may be handled whole. The materials, of diverse physical characteristics, which have been mentioned, are by no means exhaustive. Reflection will reveal more.

Movement of these "flowing materials" must, of course, be controlled. The ordinary means for controlling movement of such materials in many cases, has simply been that of "start-stop." For this purpose it has been necessary to start and stop a prime mover or a pump, or open and close a valve or gate of some nature placed across the channel or pipe.

When pumping relatively massive materials such as concrete or mud, simply stopping a prime mover may not provide adequate control. This is particularly true where large pressure heads are involved as, for example, where the piping system contains vertical sections. The flowing material will have considerable kinetic and potential energy and atmospheric pressure will not stop the flow.

In addition, the on-off manner of operation is inadequate where varying flow rates are desired. Valves which have been used in these situations are readily blocked so that flow can not be resumed or the valves are rapidly eroded so that frequent replacement is required. Also, moving material can be damaged by the valves used. This is true for the small fruits mentioned and is also true for delicate fluids such as blood.

The purpose of this invention is to provide a valve which can be used for controlling the rate of flow of many such materials which have been and which are being adapted for flowing transport. I have provided a valve for varying the shape of a flow passage to introduce a variable head loss in the stream. As is the case with most control valves, this valve is not intended for complete shut-off of the flowing material. But, with this valve a number of head losses can be introduced in the stream, at separated locations, and can be changed so that the rate of flow is controlled.

According to my invention, baffles or vanes are arranged in the channel, transversely of the stream of flowing material. The vanes are spaced from each other along the direction of the stream. Alternate vanes are rigidly affixed to the channel and are stationary. Intermediate vanes are connected to a drive mechanism and are movable between opened and closed positions.

For most applications, the stationary vanes provided have an area which is considerably less than the cross-section area of the channel or pipe. The movable vanes are then provided in a size such that their area is greater than the remaining channel area. Thus, when the valve is in its closed position, the movable and stationary vanes will be at least partially interleaved. In the opened position, the movable vanes are withdrawn from the remaining channel area, viz., that portion of the channel across which the stationary vanes do not extend.

In the opened position, there is a straight path for maximum flow through the valve at the described "remaining channel area" portions. In the closed position when the movable vanes are in a position complementing the stationary vanes, there is a serpentine path around the edges of the vanes for minimum flow. As a result, in the closed position, flowing material undergoes several changes in direction and momentum, and thus, also undergoes a large number of head losses.

Flow through the valve can be adjusted between the maximum and minimum values by changing the positions of the movable vanes. Thus, two parallel flow paths can be provided in intermediate positions with net flow in any position being the total of flow through the straight path and of flow around the vanes.

A simple and very useful embodiment of my invention, for application in a circular pipe or channel, embraces the use of flat vanes disposed perpendicularly of the main stream direction. The vanes are of equal area, which area is slightly greater than half of the channel cross-section area. The intermediate vanes are mounted on a shaft and are adjusted by rotational motion. When the valve is in the opened position, the movable vanes are fully interleaved between alternate stationary vanes. For flow control, the movable vanes are rotated to positions across the described remaining channel area portion. In the closed or minimum flow position, there is only a serpentine flow path around the inner edges of the stationary and movable vanes.

Of course many other arrangements are feasible to provide various flow versus pressure drop relationships. Drive mechanisms can be adapted to move the intermediate vanes in groups or gangs, simultaneously or serially. The vanes can have curved surfaces and can be placed across the channel in positions other than the perpendicular one described. For the latter cases, the discussion of vane areas above is applicable by considering such areas in projection at a plane perpendicular to the channel.

The following detailed description will permit ready understanding of my invention. For clarity, reference will be made to the drawings in which.

Figure 1:
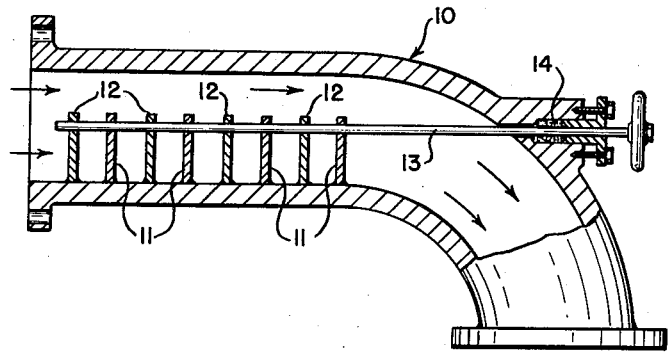
FIG. 1 is an elevation view in cross-section of an illustrative embodiment of my invention showing the valve in a pipe in the opened position.

In FIG. 1, the valve is shown mounted for use in a pipe elbow 10. The valve comprises stationary vanes 11 attached to the wall of the channel or pipe, and movable vanes 12 mounted for rotation on a drive shaft 13. The shaft 13 extends, in this case, through a suitable seal 14 in the wall of pipe 10 so that it is accessible for valve operation.

As shown, the vanes 11 and 12 are arranged transversely of the direction of the flow. The vanes are also longitudinally spaced from each other along the direction of flow. In FIG. 1, the rotatable vanes 12 are in the opened position with the open area for flow being on the upper side of the pipe. In this opened position the rotatable vanes 12 are interleaved between stationary vanes 11.

Figure 2:
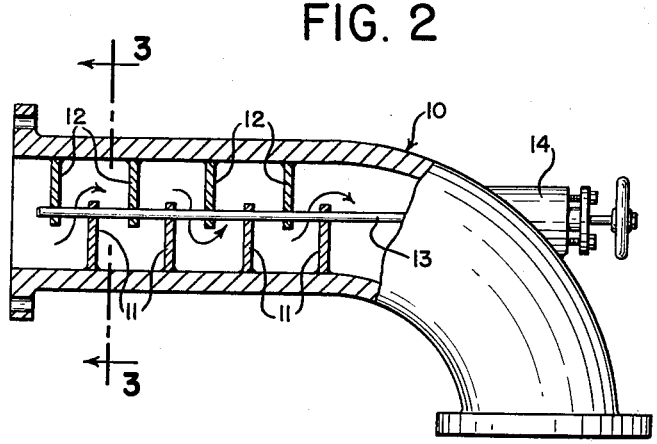
FIG. 2 is a view similar to that of FIG. 1, showing the valve in the closed position; and, FIG. 3 is a partially broken cross-section of the valve in the closed position taken along line 3—3 of FIG. 2.

In FIG. 2, the valve is shown in the closed position with rotatable vanes 12 extending across the previous unobstructed area of the channel. Thus, in the closed position, the flow path is a serpentine one around the inner edges of stationary vanes 11 and movable vanes 12.

In an ordinary valve, flow variation is provided by control of flow area. As flow area is reduced, head losses across the area are increased thus decreasing the rate of flow through and past the valve. In the valve of this invention, the shape of the flow passage is altered to produce the same effect. Although flow area may be changed somewhat with operation of the present valve, it is of no importance in explaining the results which can be achieved.

By changing passage shape, the number of head losses introduced in the stream are changed. In the opened position, the flow head loss is a function of the open area and the roughness of the array of vanes. In the closed position, the loss is a function of the number of reversals in the direction of flow experienced in the course of negotiating the staggered passages. In intermediate positions some material flows between the vanes and some through the remaining unobstructed channel.

The principle of operation can be easily explained by first considering passage of a Newtonian fluid such as water through the closed valve. At each change in direction around the vanes, the fluid loses its initial momentum and acquires momentum in a new direction. The fluid first flows with some appreciable velocity into a "dead water" region in which velocity is relatively low. From this region it flows out in a new direction.

In a low viscosity fluid, the dissipation of the momentum of the incoming stream takes place in the forming of a turbulent region at the exit from the high velocity inlet channel. This turbulent region dissipates its energy in the viscous friction of rotational shear. That is, the high velocity stream has its linear momentum translated into angular momentum of vortices. The vortices dissipate their momentum because of viscous friction, thereby warming the fluid.

By utilizing a sufficient number of momentum-dissipating stages, it is possible to effect a considerable reduction in the pressure of the fluid passing through the valve. For a given pressure drop across the valve, an increase in the number of stages will produce a related decrease in the amount of fluid passed.

Of course, the spacing between vanes as well as the number of stages will effect the pressure drop across the closed valve. The spacing may be limited by the size of particulate matter being transported, as in a liquid-solid suspension, in order to provide for a minimum flow at all times. Optimum spacing and number of stages will vary greatly among the many materials for which this valve can be used. But, practical values for these several variables can be determined for each new application by performing simple experiments with samples of the material to be transported.

I have found that for viscous or gummy materials, once a vane spacing is established, the number of stages can be increased until flow has been reduced to a desired minimum when the valve is closed. This follows because such materials shear when flowing past obstructions. The shear forces required are high and the kinetic energy of the material is substantially reduced at each change in direction.

Figure 3:
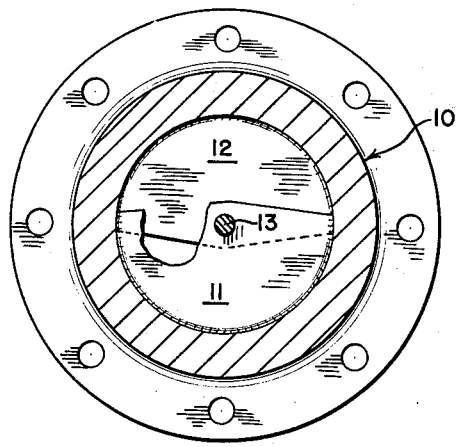

In FIG. 3, a section of the valve is shown in the closed position. In this position the movable vanes generally complement the stationary vanes. Further, it can be seen that longitudinal of axis 13, there is a projected area of overlap between stationary vanes 11 and movable vanes 12, the movable vanes complementing the stationary vanes. That is, the total of the area of one of the movable vanes and one of the stationary vanes is greater than the cross-section area of the pipe. This overlap provides the changes in direction which have been discussed, for head loss in the closed position.

With the valve of my invention flow rate control for many unordinary types of flowing materials can be readily accomplished. Precision clearances are not necessary and the valve is particularly suited for minimum and even makeshift maintenance. The valve does not depend upon contact or mating of moving parts with stationary parts for operation.

The range of application which has been indicated is wide.

Because close fits are not required, the valve is able to pass large solids or, depending on the size of valve being used, large molecules, with neither damage to the valve nor damage to moving material. The valve can be readily cleaned as by flushing which is particularly important for meeting sanitary requirements in systems for flowing foods.

For flowing materials such as asphalt and liquid metals, the valve does not freeze or stick after long periods of static positioning. Operation of the valve is insensitive to coating of surfaces by build-up of material from the stream being handled. High torques are not required to actuate the valve even when used to control movement of sticky fluids, as would be the case with, for example, an ordinary gate valve.

Corrosive materials can be readily handled for extended periods of time without change in flow in the closed position. This is achieved by providing as discussed, the areas of overlap between stationary and movable vanes. Since head losses in the closed position are largely dependent upon the provision of changes in direction of flow, considerable of the overlap can be eaten away before the flow path is straightened sufficiently to permit excessive minimum flow.

The valves of my invention are easy to fabricate and maintain. They can be fabricated from many different materials, in any size. They can, for example, utilize plastic vanes for chemical compatibility with a particular flowing material. They can be made large for controlling movement of cumbersome, lumpy streams. They can be made very small for laboratory use where carefully controlled flow rates are vital during experiments.

Having described my invention, what I claim is:

1. A flow controlling means comprising a housing, a flow channel extending longitudinally therethrough, which flow controlling means comprises a plurality of stationary and movable vanes mounted spaced from each other in said channel, said stationary vanes being affixed to the lower half of said channel, and rotatable means connected to said movable vanes for adjustment of said vanes between opened and closed positions, said opened positions being defined when said movable vanes are substantially interleaved between said stationary vanes, resulting in a longitudinally unobstructed flow in the upper half of said channel, said closed position being defined when said movable vanes complement said stationary vanes to obstruct the upper half of said channel, said obstruction causing a serpentine flow, said vanes overlapping in said closed positions.

2. A flow controlling means comprising a housing, a flow channel extending longitudinally therethrough, which flow controlling means comprises a plurality of stationary and movable vanes mounted spaced from each other in alternate longitudinal disposition transversely of said channel, said stationary vanes being affixed to the lower half of said channel, drive means connected to said movable vanes for adjustment of said vanes between opened and closed positions, said opened position being defined when said movable vanes are substantially interleaved between said stationary vanes, resulting in a longitudinally unobstructed flow in the upper half of said channel, said closed position being defined when said movable vanes complement said stationary vanes to obstruct the upper half of said channel, said obstruction causing a serpentine flow, said vanes overlapping in said closed position.

3. A flow controlling means comprising a housing, a flow channel extending longitudinally therethrough, which flow controlling means comprises a plurality of stationary and movable vanes mounted spaced from each other in alternate longitudinal disposition transversely of said channel, said stationary vanes being affixed to said channel all on one side of said channel, a member extending into said channel and mounted for rotation on said channel housing and on said stationary vanes, said plurality of movable vanes being mounted on and spaced along said rotatable member and between said stationary vanes, said rotatable member turning said movable vanes between open and closed positions, the total of the area of one of said movable vanes and one of said stationary vanes being greater than the transverse area of said channel, said movable vanes being interleaved between said stationary vanes in said opened position such that said vanes and said channel define an unobstructed longitudinal passage in the upper half of said channel for said flowing material, said movable vanes being partially interleaved between said stationary vanes in said closed position such that said vanes and said channel define a serpentine passage past said vanes for said flowing material.

References Cited in the file of this patent

UNITED STATES PATENTS

| 515,974 | Schwoerer | Mar. 6, 1894 |
| 2,568,084 | Mockridge | Sept. 18, 1951 |

FOREIGN PATENTS

| 355,345 | Great Britain | Feb. 23, 1931 |